United States Patent Office 3,413,242
Patented Nov. 26, 1968

3,413,242
ALUMINUM-OXYGEN-SILICON POLYMERS AND METHOD OF PREPARATION
Charles B. Roberts, Midland, and Darell D. Toner, Sanford, Mich., assignors to The Dow Chemical Company, Midland, Mich., a corporation of Delaware
No Drawing. Filed July 24, 1967, Ser. No. 655,342
5 Claims. (Cl. 260—2)

ABSTRACT OF THE DISCLOSURE

This invention relates to new aluminum-oxygen-silicon polymers having the general formula

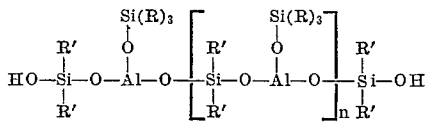

wherein R is an alkyl or aryl group, R' is an aryl or substituted aryl group and $n$ is a number from 0 to 3. The invention likewise concerns a process for preparing such polymers by reacting a trialkyl or triaryl siloxyaluminum dihydride with a diarylsilanediol in an inert atmosphere at a temperature of from about 0° C. to about 50° C.

---

This invention relates to novel inorganic polymers and to a process for the production of such polymers. It more particularly relates to new aluminum-oxygen-silicon polymers and to a method for their preparation which produces only hydrogen as a by-product.

It is an object of this invention to provide to the art novel inorganic polymers. A further object is to provide a process for the preparation of such novel polymers without the production of undesirable by-products. These and other objects and advantages of the present invention will become apparent from a reading of the following detailed description.

It has now been discovered that novel aluminum-oxygen-silicon polymers are prepared by the reaction of a trisubstituted siloxyaluminum dihydride with a diarylsilanediol in an inert solvent. The novel film-forming polymers produced by such reaction are useful as high temperature coatings and additionally contain functional groups capable of further reaction and modification. The reaction is thought to proceed as follows:

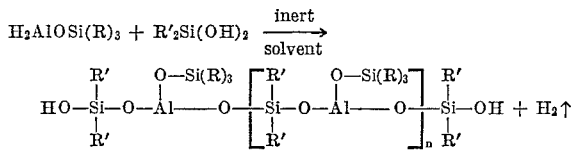

wherein R is an alkyl or aryl radical containing from 1 to about 6 carbon atoms, R' is an aryl or alkyl substituted aryl radical containing from 6 to about 12 carbon atoms, and $n$ is a number from 0 to 3.

Brief description of preferred embodiments

Suitable trisubstituted siloxyaluminum dihydride reactants include those compounds having the formula $H_2AlOSi(R)_3$ wherein R is an alkyl or aryl radical containing from about 1 to about 6 carbon atoms. Such reactants include trimethylsiloxyaluminum dihydride $[H_2AlOSi(CH_3)_3]$, triphenylsiloxyaluminum dihydride

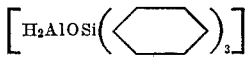

triethylsiloxyaluminum dihydride $[H_2AlOSi(C_2H_5)_3]$, triisopropylsiloxyaluminum dihydride $[H_2AlOSi(CH(CH_3)_2)_3]$ and the like.

The diarylsilanediol reactants are selected from the group of compounds having the formula $(R')_2Si(OH)_2$ wherein R' is an aryl or alkyl substituted aryl radical containing from 6 to about 12 carbon atoms. Such reactants include diphenylsilanediol, methylphenylsilanediol, dinapthylsilanediol and the like.

Reaction between these starting materials is accomplished by contacting such reactants in a suitable solvent which is inert to the reactants under the reaction conditions. Solvents such as diethyl ether, tetrahydrofuran, dioxane, diethyl ether of monoethylene glycol and the like are suitable solvents for the reaction herein. In general, the concentration of the reactants in the solvent is between the maximum solubility of the least soluble reactant and about 1 percent. Lower concentrations are usually to be avoided as they require the use of larger equipment and make solvent removal more difficult and more costly.

It is preferred to employ the reactants in substantially equimolar proportions. However, an excess of one reactant does not adversely affect the reaction or the formation of the polymer of this invention.

Once contacted in solution, the trisubstituted siloxyaluminum dihydride and diarylsilanediol react and polymerize at a temperature of between about 0° C. and about 50° C. to produce an inorganic polymer and hydrogen. It is usually most convenient to conduct the reaction at or near room temperature and atmospheric pressure. However, pressures above or below atmospheric may be employed if desired.

In general, the molecular weight of the final polymer is controlled by temperature, concentration and rate of addition of the components. It is possible, by the proper control of these variables, to produce polymers having molecular weights from about 500 to about 1100.

Upon completion of the reaction and polymerization, the polymer is recovered by removing the solvent therefrom by any suitable means such as reduced pressure distillation. Once prepared, the polymers of this invention are white amorphous solids which are soluble in organic solvents such as diethylene, benzene, and the like.

The polymers of this invention are stable up to temperatures of about 300° C. and therefore find particular utility as high temperature coatings. Also, since the polymers of this invention contain terminal hydroxyl groups, they may be further reacted and modified to produce other desirable properties.

The following example is provided to further illustrate the present invention but is not to be construed as limiting to the scope thereof.

Example 1

To a diethyl ether solution 0.3 molar in trimethylsiloxyaluminum hydride, $[H_2AlOSi(CH_3)_2]$, was added an equimolar proportion of a 0.3 molar solution of diphenylsilanediol in diethyl ether. The mixture was agitated and allowed to stand for 5 minutes. During this period hydrogen was given off from the reaction mixture. At the end of the reaction period, the solvent was removed by heating the reaction mass at reduced pressure. A solid, white glassy polymer which displayed film-forming properties remained in the reaction vessel.

Various modifications can be made in the present invention without departing from the spirit or scope thereof for it is understood that we limit ourselves only as defined in the appended claims.

We claim:
1. A polymer composition having the formula

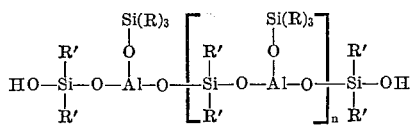

wherein R is an alkyl or aryl group containing from about 1 to about 6 carbon atoms, R' is an aryl or alkyl substituted aryl group containing from 6 to about 12 carbon atoms and $n$ is a number from 0 to 3.

2. The composition of claim 1 wherein R is a methyl group and wherein R' is a phenyl group.

3. A process for the preparation of aluminum-oxygen-silicon polymers which comprises contacting a trialkylsiloxyaluminum dihydride containing from about 3 to about 6 carbon atoms with a diarylsilanediol containing from about 6 to about 12 carbon atoms in an inert solvent at a temperature of from about 0° C. to about 50° C. and separating the polymer from the inert solvent.

4. The process of claim 3 wherein the reaction temperature is about room temperature.

5. The process of claim 3 wherein the reactants are trimethylsiloxyaluminum hydride and diphenylsilanediol.

References Cited

UNITED STATES PATENTS

| | | | |
|---|---|---|---|
| 3,061,587 | 10/1962 | Rust et al. | 260—46.5 |
| 3,184,418 | 5/1965 | Woods et al. | 260—2 |

FOREIGN PATENTS

| | | |
|---|---|---|
| 706,952 | 3/1965 | Canada. |

DONALD E. CZAJA, *Primary Examiner.*

M. I. MARQUIS, *Assistant Examiner.*